United States Patent [19]
Bensinger

[11] 3,805,920
[45] Apr. 23, 1974

[54] OIL PAN FOR AN ENGINE
[75] Inventor: Wolf-Dieter Bensinger, Stuttgart, Germany
[73] Assignee: Daimler-Benz Aktiengesellschaft, Stuttgart, Germany
[22] Filed: Aug. 7, 1972
[21] Appl. No.: 278,387

[30] Foreign Application Priority Data
Aug. 7, 1971 Germany............................ 2139740

[52] U.S. Cl................................. 184/6.2, 184/6.5
[51] Int. Cl............................................ F01m 11/06
[58] Field of Search.......... 184/106, 103 R, 6.2, 6.5; 244/135

[56] References Cited
UNITED STATES PATENTS
3,590,953  7/1971  Wellauer............................. 184/106
2,938,601  5/1960  Brafford............................. 184/6.2 X
2,440,815  5/1948  Wharam et al.................. 184/106 X
1,789,579  1/1931  D'Agostino........................ 184/6.2 X FOREIGN PATENTS OR APPLICATIONS
1,034,239  6/1966  Great Britain...................... 184/6.2

Primary Examiner—Manuel A. Antonakas
Attorney, Agent, or Firm—Craig and Antonelli

[57] ABSTRACT

An oil pan for an engine, especially for a motor vehicle internal combustion engine which is arranged underneath the engine and into which an oil suction pipe extends; partition walls are provided which subdivide the oil pan into several chambers that are in communication with each other within the area of the bottom of the pan.

9 Claims, 3 Drawing Figures

OIL PAN FOR AN ENGINE

The present invention relates to an oil pan for an engine, especially for a motor vehicle internal combustion engine which is arranged underneath the engine and into which projects an oil suction pipe.

In the modern motor vehicle construction, especially in passenger motor vehicles, one aims at keeping the engine hood as low as possible. A consequence thereof is that little space is available for the oil pan to be accommodated underneath the engine since a certain ground or road clearance has to be maintained. The oil pan or sump is therefore constructed flat and very wide in order to be able to accommodate the necessary oil volume. The danger exists as a result thereof that the oil level, for example, when driving through a curve, is displaced toward the side so far that the oil suction pipe disposed in the center is located outside the oil level and sucks in air.

The present invention is therefore concerned with the task to provide an oil pan of the aforementioned type which can be constructed very low and very wide without the existence of the danger that the oil suction pipe emerges out of the oil level when driving through a curve. The present invention essentially resides in that partition walls are provided which subdivide the oil pan into several chambers which are in communication with one another within the area of the bottom. It is achieved thereby that the oil level which will establish itself when driving through a curve is so established actually that the oil suction pipe dips or immerses with certainty into the oil.

In order not to prevent the overflow of the oil during the normal operation between the individual chambers yet to limit such overflow when driving through a curve, according to a further feature of the present invention, three chambers are provided of which the two outer chambers are connected with the center chamber by way of horizontally disposed pipes or tubes. In order to achieve that these pipes emerge out of the liquid already early when driving through a curve or the like, it is advantageous if the pipes terminate within the area of the outer wall of the oil pan, whence the partition walls are each provided with an indentation or bulge for the pipe of the opposite chamber. In order not to impair the flow of the oil, it is advantageous if venting bores are provided within the upper area of the partition walls.

Accordingly, it is an object of the present invention to provide an oil pan for an engine, especially for a motor vehicle internal combustion engine which avoids by simple means the aforementioned shortcomings and drawbacks encountered in the prior art.

Another object of the present invention resides in an oil pan for engines which permits a relatively low and wide construction of the oil pan without the danger that the centrally arranged oil suction pipe no longer dips into the oil when driving through curves or the like.

A further object of the present invention resides in an oil sump for engines which is relatively simple in construction, yet is extremely reliable in operation to assure absence of air in the oil suction pipe to the greatest possible extent.

These and further objects, features and advantages of the present invention will become more apparent from the following description when taken in connection with the accompanying drawing which shows, for purposes of illustration only, one embodiment in accordance with the present invention, and wherein.

Figure 1:
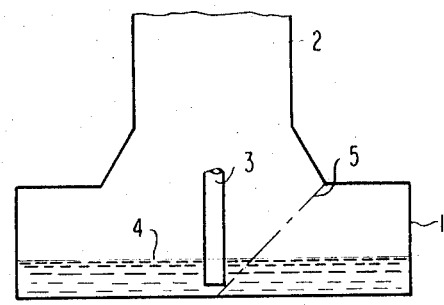
FIG. 1 is a schematic vertical cross-sectional view through a prior art oil pan.

Referring now to the drawing wherein like reference numerals are used throughout the various views to designate like parts, an oil pan 1 as known in the prior art is illustrated in FIG. 1 which is arranged underneath an internal combustion engine 2 indicated only schematically. A centrally arranged oil suction pipe 3 projects into this oil pan 1. In order to reduce the overall height of the engine 2 and of the oil pan 1, the oil pan 1 is constructed flat and very wide. The oil pan 1 is filled with a predetermined quantity of oil which normally adjusts itself to the oil level 4. When driving through a curve, the danger exists that the oil escapes toward the side whereby an oil level 5 may adjust itself, as indicated in dash and dot lines, which is so disposed that the oil suction pipe 3 no longer dips into the oil and thus air is sucked in.

Figure 2:
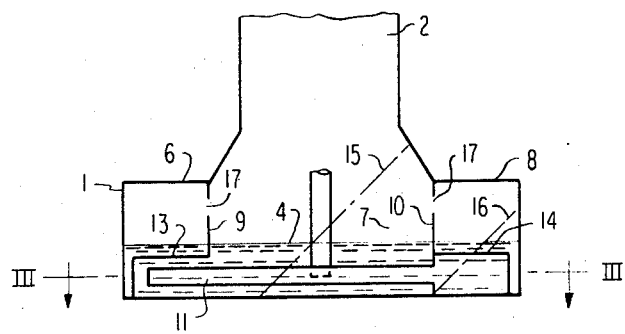
FIG. 2 is a schematic vertical cross-sectional view through an oil pan according to the present invention.
Figure 3:
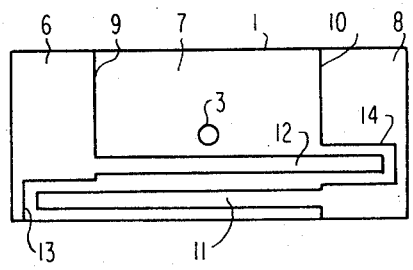
FIG. 3 is a cross-sectional view, taken along line III—III of FIG. 2.

This danger is avoided in the oil pan of the present invention according to FIGS. 2 and 3 without increasing the oil quantity. The oil pan 1 according to this invention is subdivided in the illustrated embodiment into three chambers 6, 7 and 8 by means of partition walls 9 and 10. The outer chambers 6 and 8 are connected with the central chamber 7 by way of horizontally disposed pipes 11 and 12 provided with appropriate connecting apertures (not shown). The oil suction pipe 3 is arranged centrally with respect to the center chamber 7. These pipes 11 and 12 are disposed closely above the bottom of the oil pan 1. The pipes 11 and 12 are extended close to the outer walls of the oil pan 1 of the respective opposite side, for which purpose corresponding indentations 13 and 14 are provided in the partition walls 9 and 10. As can be seen from FIGS. 2 and 3, the connecting pipes 11 and 12 extend from their respective outer chamber 6 and 8 close to the outer wall of the oppositely disposed oil pan wall.

In the normal operation, an oil level 4 will adjust itself also in the oil pan 1 according to the present invention. If the oil is displaced during a curve drive, for example, toward the right, then an oil level 5 does not establish itself as in the construction according to FIG. 1, but instead an oil level 15 and 16 will establish itself in the chambers 7 and 8, respectively. The oil thereby flows out of the chamber 6 by way of the pipe 12 into the chamber 7 and thus increases the oil level 15 to a value which suffices with certainty that the oil suction pipe 3 immerses into the oil. Only a slight quantity of the oil can flow out of the chamber 7 by way of the pipe 11 into the chamber 8 as already after a relatively short period of time, the end of the pipe 11 emerges out of the liquid.

In order not to impair the in- and out-flow in and out of the chambers 6 and 8, venting bores 17 are provided in the upper areas of the partition walls 9 and 10. The oil pan 1 is so arranged that its largest width is disposed transversely to the driving direction in the engine of a motor vehicle, i.e., that the chamber 7 is arranged approximately in the vehicle center and the chambers 6 and 8 laterally thereof.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An engine oil pan of the type arranged underneath an internal combustion engine comprising:
 a housing,
 partition wall means for subdividing said housing into three longitudinally arranged chambers consisting of two outer chambers and a central chamber between the two outer chambers, and
 pipe means for directly connecting each outer chamber with said central chamber
 said pipe means extending generally horizontally near the bottom of said housing, and said pipe means having an end leading out of each respective outer chamber into said central chamber, said end terminating in an area approximately between respective opposite outer walls of said housing and the center of said housing.

2. An oil pan according to claim 1, characterized in that vent bore means are provided within the upper area of the partition wall means.

3. An oil pan according to claim 1, wherein said pipe means extend from said respective opposite outer chambers across the center chamber into an offset portion of the opposite outer chamber to terminate near the outer walls of said housing.

4. An oil pan according to claim 3, wherein vent bore means are provided within the upper area of the partition wall means.

5. An oil pan according to claim 1, wherein said pipe means are integrally formed with said partition wall means.

6. An engine oil pan for internal combustion engines of the type wherein an oil suction pipe extending between the oil pan and the engine maintains an end in the oil pan below the oil level comprising a central chamber into which an oil suction pipe extends, a plurality of additional chambers surrounding said central chamber, and oppositely extending pipe means for directly connecting said central chamber with respective pairs of opposite additional chambers of said plurality, each said pipe means having an end opening into said central chamber approximately between a wall of a respective opposite additional chamber and the center of said central chamber so that the oil level in said central chamber is maintained above the end of the oil suction pipe in the oil pan by filling said central chamber from one of said two opposite additional chambers through the respective pipe means during an inclination of said oil pan.

7. An engine oil pan according to claim 6, wherein said plurality of additional chambers consists of two additional chambers on opposite sides of said central chamber.

8. An engine oil pan according to claim 7, wherein said wall of the respective opposite additional chamber is indented to extend the length of said pipe means.

9. An engine oil pan according to claim 8, wherein vent means are provided between said central chamber and each said additional chamber.

* * * * *